(12) United States Patent
Vezain et al.

(10) Patent No.: US 9,086,123 B2
(45) Date of Patent: Jul. 21, 2015

(54) ANGULAR POSITIONING DEVICE COMPRISING TWO MECHANICAL MOVEMENT TRANSMISSION ASSEMBLIES WHICH ARE EACH IMBRICATED AT TWO DEAD CENTRES

(71) Applicant: Thales, Neuilly-sur-Seine (FR)

(72) Inventors: Stephane Vezain, Mandelieu (FR);
Yannick Baudasse, Grasse (FR);
Sebastien Guionie, Frejus (FR)

(73) Assignee: THALES, Courbevoie (FR)

( * ) Notice: Subject to any disclaimer, the term of this patent is extended or adjusted under 35 U.S.C. 154(b) by 29 days.

(21) Appl. No.: 13/971,789

(22) Filed: Aug. 20, 2013

(65) Prior Publication Data

US 2014/0060222 A1   Mar. 6, 2014

(30) Foreign Application Priority Data

Aug. 31, 2012   (FR) ..................................... 12 02341

(51) Int. Cl.
| | |
|---|---|
| *F16H 19/08* | (2006.01) |
| *G02B 7/00* | (2006.01) |
| *G02B 7/182* | (2006.01) |
| *F16H 21/54* | (2006.01) |
| *F16M 11/12* | (2006.01) |
| *F16M 11/18* | (2006.01) |

(52) U.S. Cl.
CPC ................ *F16H 19/08* (2013.01); *F16H 21/54* (2013.01); *F16M 11/126* (2013.01); *F16M 11/18* (2013.01); *G02B 7/005* (2013.01); *G02B 7/1827* (2013.01); *Y10T 74/182* (2015.01)

(58) Field of Classification Search
CPC .......... G03B 15/00; G03B 5/00; G03B 17/00; G02B 7/182; F16H 21/52; F16M 11/18
USPC .......... 74/25, 42–44, 490.01, 490.05, 490.06; 250/252.1; 356/138, 153, 614, 139.08
See application file for complete search history.

(56) References Cited

U.S. PATENT DOCUMENTS

| | | | |
|---|---|---|---|
| 3,026,615 A | 11/1958 | Aubert | |
| 3,900,243 A | 8/1975 | Johnsson | |
| 4,025,193 A * | 5/1977 | Pond et al. | ...................... 356/5.1 |

(Continued)

FOREIGN PATENT DOCUMENTS

| | | |
|---|---|---|
| FR | 2234617 A1 | 1/1975 |
| GB | 1306641 | 2/1973 |
| JP | 2002148685 A | 5/2002 |

*Primary Examiner* — William Kelleher
*Assistant Examiner* — Bobby Rushing, Jr.
(74) *Attorney, Agent, or Firm* — Baker & Hostetler LLP

(57) ABSTRACT

In the transmission of mechanical movements, a mechanical angular positioning device is provided, and applies to optical instruments to position an element like a mirror according to three predefined positions. The angular positioning device comprises a frame and two imbricated mechanical movement transmission assemblies. The first assembly comprises a first support in pivot connection with the frame according to a first axis, which is rotatable by a first motor via two connecting rods which generate two dead centers for the first support. The second mechanical assembly comprises a second support in pivot connection with the first support, according to a second axis, not parallel with first axis. This second support is rotatable by a second motor via two connecting rods which generate two dead centers for the second support. One of the dead centers of the first support can coincide with one of the dead centers of the second support.

10 Claims, 3 Drawing Sheets

(56) References Cited

U.S. PATENT DOCUMENTS 4,790,199 A * 12/1988 Bauer et al. .................. 74/48

2013/0087005 A1 * 4/2013 Van Lookeren Campagne et al. .................. 74/490.08
2013/0312551 A1 * 11/2013 Ehrmann .................. 74/44

* cited by examiner

ANGULAR POSITIONING DEVICE COMPRISING TWO MECHANICAL MOVEMENT TRANSMISSION ASSEMBLIES WHICH ARE EACH IMBRICATED AT TWO DEAD CENTRES

CROSS-REFERENCE TO RELATED APPLICATION

This application claims priority to foreign French patent application No. FR 1202341, filed on Aug. 31, 2012, the disclosure of which is incorporated by reference in its entirety.

FIELD OF THE INVENTION

The invention relates to the field of transmission of mechanical movements. It concerns a mechanical angular positioning device, and applies notably to optical instruments which make it necessary to position an element such as a mirror according to three predefined positions.

BACKGROUND

Many mechanical devices exist for carrying out angular positioning. For example, a simple step motor can permit angular positioning according to one of its steps. However, the conventional devices can be unsuitable for certain applications. This is the case for example when angular precisions of approximately a hundredth of a degree are necessary. Furthermore, additional difficulties are encountered when it is wished to obtain good stability and good reliability of the different angular positions. In other words, it is difficult to obtain precise positions which can be maintained for given durations, and which can be obtained once more when they have been left. Stringent requirements in terms of precision, stability and reliability apply notably in the field of optical instrumentation. By way of example, an optical instrument may need calibration of one of its sensors. This calibration can consist of orienting a mirror according to three distinct angular positions. A first position, known as the scene position, corresponds to the position in which the mirror reflects radiation from an area to be studied. It is said that the mirror points towards the area to be studied. Two other positions, known as calibration positions, correspond to positions in which the mirror reflects the radiation of reference sources. These reference emitters consist for example of black bodies or sighting towards cold space. In this case, the calibration of the sensor requires positioning of the mirror in the first calibration position, then in the second calibration position, and finally in the scene position.

It will be appreciated that one of the elements which affects the behaviour of the mechanical positioning device is the actuator. In general, this is a rotary electric motor. Different types of electric motors can be used. Mobile coil motors known as "voice coil" motors have great precision. However, they need control by means of servo-control in a closed loop, and the retention in a given position necessitates a permanent electrical supply. Piezoelectric actuators also have great precision. However, they must also be controlled by means of servo-control in a closed loop. In addition, they have a product of force to course which is relatively low. In practice it is therefore necessary to use piezoelectric actuators with large dimensions. Step motors have the advantage of being able to be controlled without a closed loop, and permit retention of a position without needing a supply. On the other hand, the angular precision is generally insufficient. One solution consists of associating a speed reducer with the step motor. The reducer makes it possible to reduce the angular displacement at the output relative to the angular displacement of the motor. Thus, for each step of the motor, the angular displacement at the output represents a fraction of this step. The reducer can for example take the form of a device with gears. However, in order to obtain low transmission ratios, for example of approximately a hundredth, the device must comprise a large number of toothed wheels. In addition to the problems of complexity and size, a reducer of this type introduces play and resistant torque. Devices for elimination of play exist, but they introduce additional torque. Another reducer solution is based on the use of an arm which is rotated by the motor by means of two connecting rods. The arm is in pivot connection with a frame. A first connecting rod is rotated by the motor. The second connecting rod is connected to the first connecting rod by a first pivot connection, and it is connected to the arm by a second pivot connection. When the axes of these two pivot connections are on the same plane as the axis of rotation of the motor, the two connecting points generate a dead centre, i.e. a configuration in which the movement of rotation of the arm is inverted. This inversion is accompanied by a localized decrease in the transmission ratio between the angular displacement of the arm and that of the rotor. However, a device of this type comprises only two dead centres, and it is not suitable for angular positioning according to three distinct positions.

SUMMARY OF THE INVENTION

An object of the invention is notably to provide a mechanical device which can provide three distinct angular positions with a low transmission ratio. For this purpose, the invention proposes the combination of two mechanical assemblies with connecting rods, i.e. a first mechanical assembly which generates two dead centres in a movement of rotation around a first axis, and the second mechanical assembly which generates two dead centres in a movement of rotation around a second axis, which is not parallel with the first axis. More specifically, the object of the invention is an angular positioning device comprising a frame, a first mechanical movement transmission assembly, and a second mechanical movement transmission assembly. The first mechanical assembly comprises:

a first support in pivot connection with the frame, according to a first axis;

a first connecting rod in pivot connection with the first support, according to a second axis, which is parallel with the first axis;

a second connecting rod in pivot connection with the first connecting rod, according to a third axis, and in pivot connection with the frame according to a fourth axis, the third and fourth axes being parallel with the first and second axes; and a first actuating device which can rotate the second connecting rod according to the fourth axis.

The first mechanical movement transmission assembly is configured such that the first support can adopt two distinct angular positions around the first axis, for each of which the first and second connecting rods generate a dead centre for the first support.

The second mechanical movement transmission assembly comprises:

a second support in pivot connection with the first support according to a fifth axis, which is not parallel with the first axis;

a third connecting rod in pivot connection with the second support according to a sixth axis, and in pivot connection with the second support according to a seventh axis, which is parallel with the fifth axis;

a fourth connecting rod in pivot connection with the third connecting rod according to an eighth axis, and in pivot connection with the frame according to a ninth axis, the eighth and ninth axes being parallel with the fifth and seventh axes; and a second actuating device which can rotate the fourth connecting rod according to the ninth axis.

The second mechanical movement transmission assembly is configured such that the second support can adopt two distinct angular positions around the fifth axis, for each of which the third and fourth connecting rods generate a dead centre for the second support.

The angular positioning device is configured such that the fifth axis is parallel with the seventh axis in one of the angular positions of the first support around the first axis, and the sixth axis is combined with the first axis, in one of the angular positions of the second support around the fifth axis.

According to a particular embodiment, the seventh, eighth and ninth axes are at right angles to the first, second, third and fourth axes.

The first actuating device can comprise a rotary motor comprising a stator which is integral with the frame of the angular positioning device, and a rotor which is integral with the second connecting rod. Similarly, the second actuating device can comprise a rotary motor comprising a stator which is integral with the frame of the angular positioning device, and a rotor which is integral with the fourth connecting rod.

According to a particular embodiment, the first support comprises a drive arm, the pivot connection of the first support with the frame being provided at a first end of the drive arm, and the pivot connection of the first support with the first connecting rod being provided at a second end of the drive arm.

According to a particular embodiment, the first support comprises a frame inside which the second support is arranged.

The first and second connecting rods can generate a dead centre for the first support when the third axis coincides with the plane which contains the second axis and the fourth axis. Similarly, the third and fourth connecting rods can generate a dead centre for the second support, when the eighth axis coincides with the plane containing the seventh axis and the ninth axis.

According to a particular embodiment, the pivot connections between the third connecting rod and the second support comprise a first pivot connection between the third connecting rod and a connection arm according to the seventh axis, and a second pivot connection between the connection arm and the second support according to the sixth axis.

The object of the invention is also a system for calibration of an optical instrument, comprising an angular positioning device such as previously described, and an element of the optical instrument which can be secured on the second support.

The invention notably has the advantage that it makes it possible to obtain both a low transmission ratio around angular positions of interest, and a greater transmission ratio outside these positions, which makes it possible to increase the speed of passage between the different positions.

BRIEF DESCRIPTION OF THE DRAWINGS

The invention will be better understood and other advantages will become apparent from reading the following description, provided with reference to the attached drawings in which.

DETAILED DESCRIPTION

In general, the angular positioning device according to the invention comprises a frame and two imbricated mechanical movement transmission assemblies. The first mechanical assembly comprises a first support which is in pivot connection with the frame according to a first axis. This support can be rotated by a first motor via two connecting rods which generate two dead centres for the first support. The second mechanical assembly comprises a second support which is in pivot connection with the first support according to a second axis, which is not parallel with the first axis. This second support can be rotated by a second motor via two connecting rods which generate two dead centres for the second support. The angular positioning device is configured such that one of the dead centres of the first support can coincide with one of the dead centres of the second support.

Figure 1:
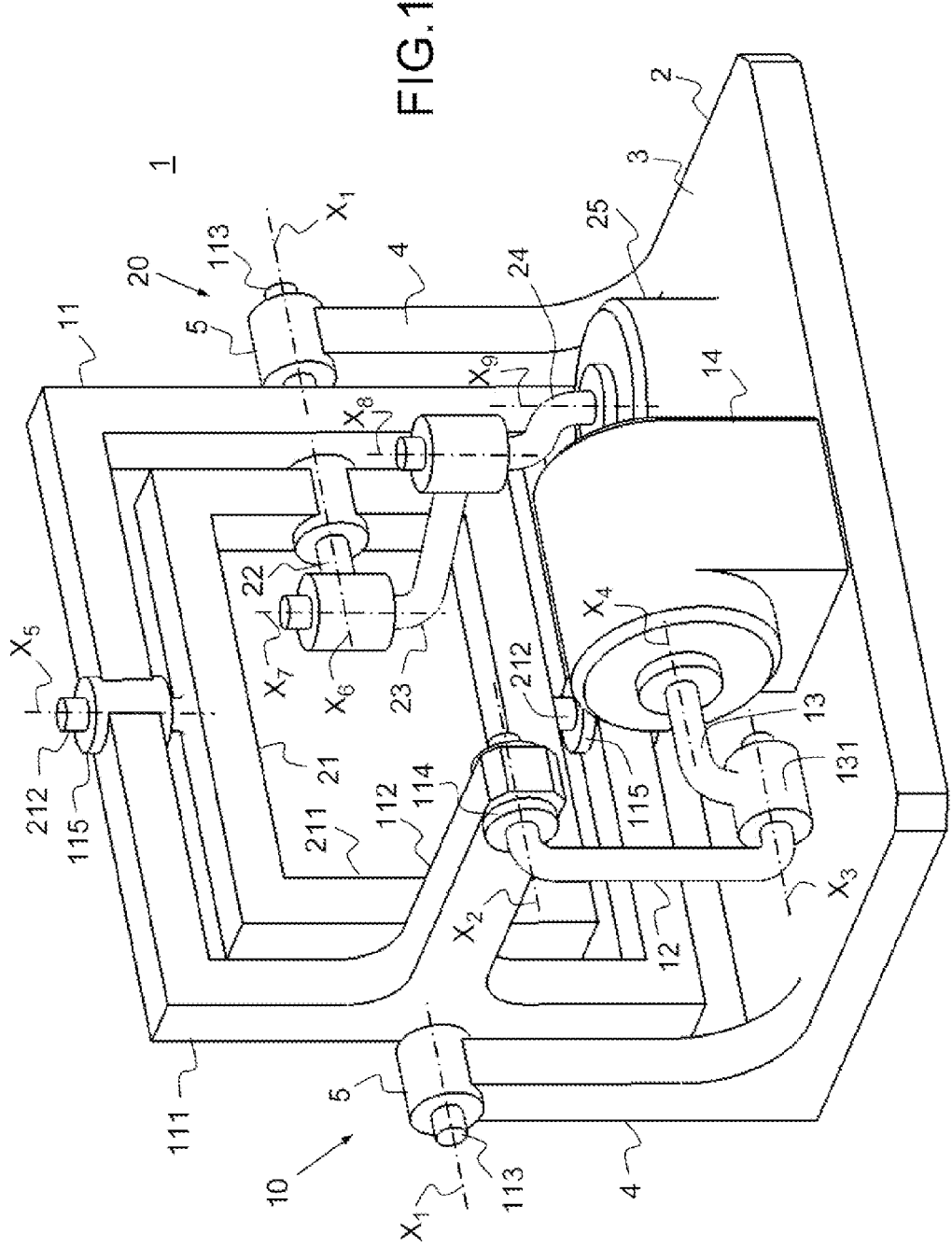
FIGS. 1 and 2 represent in two views in perspective an example of an angular positioning device according to the invention.
Figure 2:
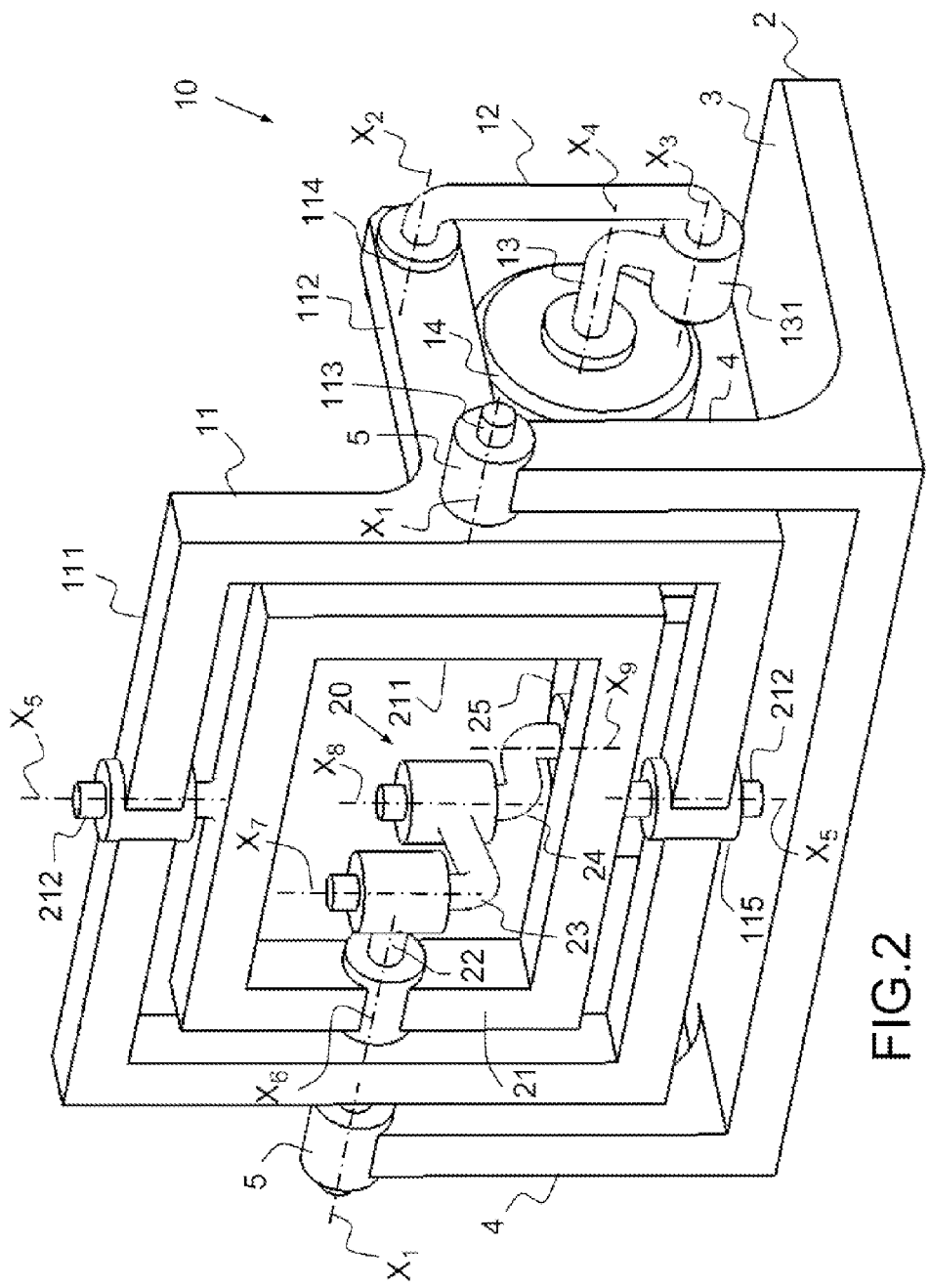

FIGS. 1 and 2 represent, in two views in perspective, an example of an angular positioning device according to the invention. The angular positioning device 1 comprises a frame 2, a first mechanical movement transmission assembly 10, and a second mechanical movement transmission assembly 20. The first mechanical assembly 10 comprises a first support 11, two connecting rods 12 and 13, and a first actuating device 14. The support 11 is in pivot connection with the frame 2 according to a first axis $X_1$. The second connecting rod 12 is in pivot connection with the support 11 according to a second axis $X_2$ parallel to the axis $X_1$. The second connecting rod 13 is in pivot connection with the first connecting rod 12 according to a third axis $X_3$, parallel to the axes $X_1$ and $X_2$, and in pivot connection with the frame 2 according to a fourth axis $X_4$, parallel to the axes $X_1$, $X_2$ and $X_3$. The actuating device 14 can rotate the second connecting rod around the axis $X_4$. In the present embodiment, the frame 2 comprises a plate 3 and two arms 4 which extend from the plate 3 in a direction at right angles to the plane of the plate 3. The support 11 comprises a rectangular framework 111 and a drive arm 112 which extends in a direction at right angles to the plane of the framework 111. A first end of the drive arm 112 is integral with the framework 111. The pivot connection between the support 11 and the frame 2 is provided by means of two shafts or pins 113 which are secured on the lateral sides of the framework 111, and two bearings 5 formed at the ends of the arms 4. The pivot connection between the support 11 and the connecting rod 12 is provided at the second end of the drive arm 112. The connecting rod 12 comprises a bend at each of its ends, such that one of the ends is inserted in a bearing 114 formed in the drive arm 112. The other end of the connecting rod 12 is inserted in a bearing 131 formed at one of the ends of the connecting rod 13. The actuating device 14 is a rotary motor comprising a stator which is integral with the frame 2 and a rotor which is integral with the second end of the connecting rod 13 and rotates around the axis $X_4$. This is for example a step motor. The pivot connection between the connecting rod 13 and the frame 2 is thus provided by the rotary motor. The second mechanical movement transmission assembly 20 comprises a second support 21, a connection arm 22, two connecting rods 23 and 24, and a second actuating device 25. The second support 21 is in pivot connection with the first support 11 according to a fifth axis $X_5$. This axis $X_5$ is not parallel with the axes $X_1$ to $X_4$. As in the embodiment in FIGS. 1 and 2, it can be at right angles to the axes $X_1$ to $X_4$. The connection arm 22 is in pivot connection with the support 21 according to an axis $X_6$, the orientation of which is discussed hereinafter. The third connecting rod 23 is in pivot connection with the connection arm 22 according to an axis $X_7$, parallel to the axis $X_5$. The fourth connecting rod 24 is in pivot connection with the third connecting rod 23, according to an axis $X_8$, and in pivot connection with the frame 2 according to an axis $X_9$. The axes $X_8$ and $X_9$ are parallel with the axes $X_5$ and $X_7$. In the embodiment in FIGS. 1 and 2, the support 21 comprises a rectangular frame 211 which is incorporated in the framework 111 of the first support 11. The pivot connection between the second support 21 and the first support 11 is provided by means of two pins 212 secured on the longitudinal sides of the framework 211, and two bearings 115 formed on the longitudinal sides of the framework 111. Similarly, the pivot connection between the support 21 and the connection arm 22, the pivot connection between the connection arm 22 and the connecting rod 23, and the pivot connection between the connecting rods 23 and 24, can each be provided by means of a pin and a bearing which cooperate with one another. The actuating device 25 is a rotary motor comprising a stator which is integral with the frame 2, and a rotor which is integral with the connecting rod 24, and rotates around the axis $X_9$. It can also be a step motor. The pivot connection between the connecting rod 24 and the frame 2 is thus provided by the rotary motor.

In the embodiment in FIGS. 1 and 2, it has been considered that the articulations between the different elements were provided by pins and bearings forming pivot connections. In general, these articulations can be provided by any mechanism which introduces a degree of freedom of rotation around the axis concerned. In particular, each pivot connection could be replaced by a sliding pivot connection with the same axis of rotation, or by a ball joint connection. In addition, the pivot connection between the support 21 and the connection arm 22, and the pivot connection between the arm 22 and the connecting rod 23 could be combined in a single ball joint connection with a finger between the support 21 and the connecting rod 23, according to an axis at right angles to the axes $X_6$ and $X_7$. The connection arm 22 is then no longer necessary. The ball joint connection with a finger could also be replaced by a ball joint connection or an annular linear connection.

The angular positioning device according to the invention is controlled by the actuating devices 14 and 25. These actuating devices function in turn such as to obtain three distinct angular positions for the second support 21. This support 21 can receive an element to be positioned, for example a mirror of an optical instrument. The actuating device 14 makes it possible to orient the second support 21 around the axis $X_1$. Its actuation rotates the connecting rod 13 around the axis $X_4$, which rotates the connecting rod 12 around its instantaneous centre of rotation, which itself rotates the drive arm 112 around the axis $X_1$, and thus the frameworks 111 and 211. It should be noted that the rotation of the frameworks 111 and 211 is possible only if the framework 211 can rotate relative to the frame 2 according to the same axis as that of the pivot connection between the framework 111 and the frame 2, i.e. if the axis $X_6$ is combined with the axis $X_1$. The first mechanical assembly 10 is configured such as to be able to adopt two particular configurations. In each of these configurations, the connecting rods 12 and 13 generate a dead centre for the support 11. In general, a dead centre between two connecting rods in pivot connection between one another means a particular respective position of these connecting rods, for which each element which is in pivot connection with one of these connecting rods is subjected to inversion of movement during the passage via this position. The movement can be a movement of rotation of translation. In this case, the connecting rods 12 and 13 generate a dead centre for the support 11 when the axis $X_3$ of the pivot connection between these connecting rods coincides with the plane which passes via the axes $X_2$ and $X_4$ of the pivot connections between the connecting rod 12 and the drive arm 112, and between the connecting rod 13 and the frame 2, respectively. In the embodiment in FIGS. 1 and 2, a first dead centre is generated when the axis $X_4$ is situated between the axes $X_2$ and $X_3$, as represented in FIGS. 1 and 2, and a second dead centre is generated when the axis $X_3$ is situated between the axes $X_2$ and $X_4$. For other configurations of the first mechanical assembly 10, a dead centre could be generated when the axis $X_2$ is situated between the axes $X_3$ and $X_4$. During the passage via a dead centre, the direction of rotation of the support 11 is inverted for the same direction of rotation of the actuating device 14. This inversion of the direction of rotation takes place for two angular positions $\alpha_1$ and $\alpha_2$ of the support 11 around the axis $X_1$. Thus, continuous rotation of the connecting rod 13 around the axis $X_4$ gives rise to a balance movement of the support 11, between the angular positions $\alpha_1$ and $\alpha_2$. In addition, the passage via a dead centre gives rise to a decrease in the transmission ratio between the angular displacement of the connecting rod 13 and that of the support 11. The angular positions $\alpha_1$ and $\alpha_2$ are thus relatively stable angular positions.

Figure 3:
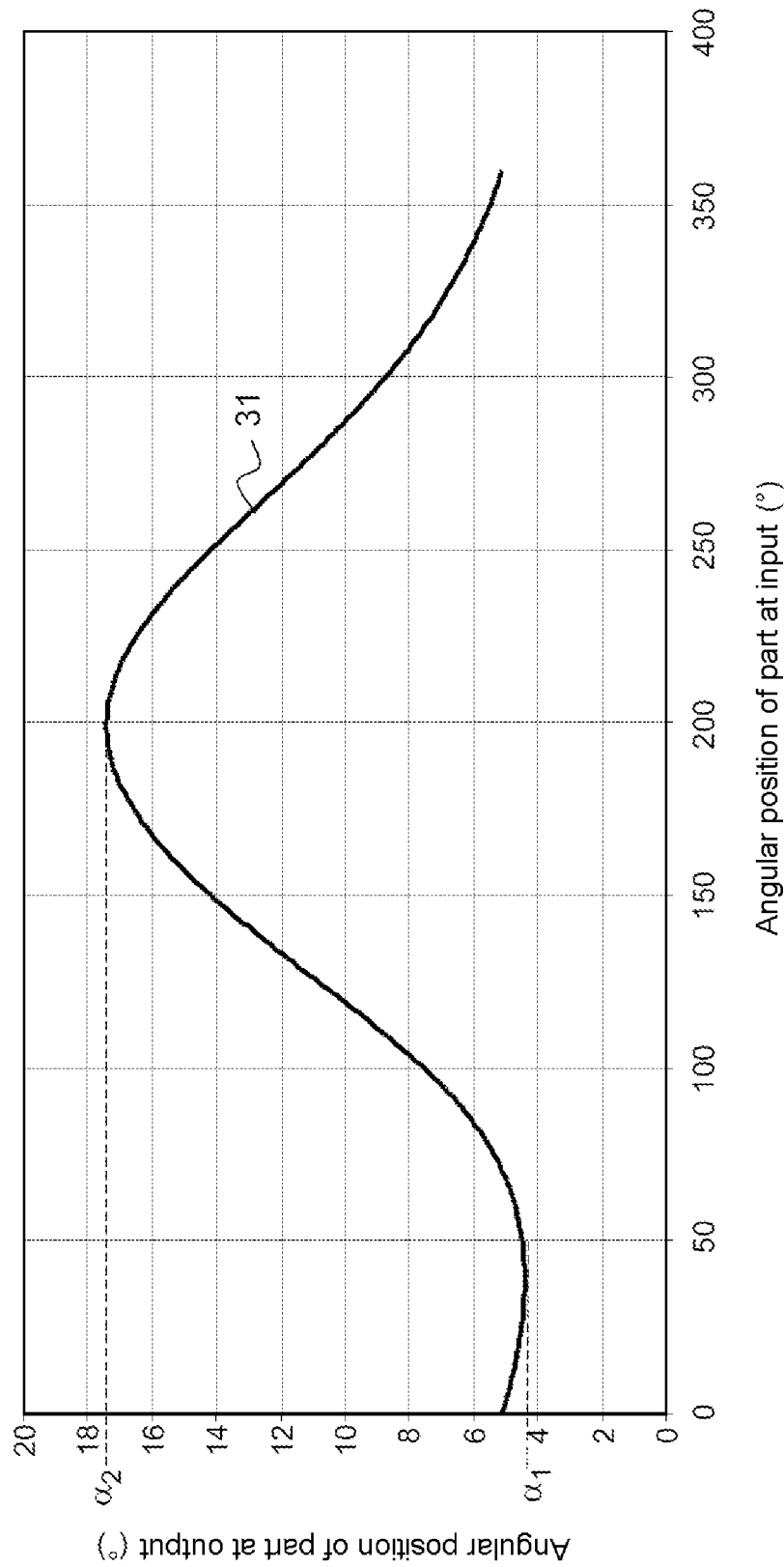
FIG. 3 illustrates in the form of a graph the development of an angular position of a part at the output of a mechanical movement transmission assembly of the angular positioning device in FIGS. 1 and 2, according to an angular position of a part at the input of this mechanical assembly.

FIG. 3 illustrates in the form of a graph the development of the angular position of the support 11 according to the angular position of the connecting rod 13 for the first mechanical movement transmission assembly 10 in FIGS. 1 and 2. This development is represented by a curve 31. Each angular position is located relative to an angular reference position. As previously stated, a movement of rotation of the connecting rod 13 gives rise to a movement of rotation of the support 11 in a first direction of rotation, as far as an angular position $\alpha_1$ for which the connecting rods 12 and 13 generate a first dead centre. When approaching this angular position $\alpha_1$, the transmission ratio between the angular displacement of the connecting rod 13 and the angular displacement of the support 11 decreases, as shown by the flattening of the curve 31 in the vicinity of the angular position $\alpha_1$, until this angular position is cancelled out. When leaving the angular position $\alpha_1$, the movement of rotation of the support 11 is inverted. The transmission ratio increases progressively whilst moving away from the angular position $\alpha_1$, then decreases once more when approaching the angular position $\alpha_2$, for which the connecting rods 12 and 13 generate a second dead centre. In the angular position $\alpha_2$, this is cancelled out, and the movement of rotation of the support 11 is inverted once more, thus regaining the first direction of rotation. The transmission ratio then increases progressively, then decreases once more when approaching the angular position $\alpha_1$, with the connecting rod 13 having carried out a complete rotation. FIG. 3 thus shows that, for a complete rotation of the connecting rod 13, the support 11 oscillates between the angular positions $\alpha_1$ and $\alpha_2$. Provided that the angular travel between these positions is relatively slight, i.e. approximately 13° in the embodiment in FIGS. 1 and 2, it is clearly apparent that the mean transmission ratio between the angular displacement of the connecting rod 13 and the angular displacement of the support 11 is distinctly lower than one. Above all, the passage via the dead centres gives rise locally to a substantial decrease in the transmission ratio.

The actuating device 25 makes it possible to orient the second support 21 around the axis $X_5$. Its actuation rotates the connecting rod 24 around the axis $X_9$, which rotates the connecting rod 23 around its instantaneous centre of rotation, which itself rotates the connection arm 22 and the support 21 around the axis $X_5$. It should be noted that the rotation of the support 21 is possible only if the axis $X_5$ of the pivot connection between the supports 11 and 21 is parallel to the axes $X_7$, $X_8$ and $X_9$. The orientation of the axis $X_5$ depends on the angular position of the support 11 around the axis $X_1$. Preferably, the first mechanical assembly 10 is configured such that the axis $X_5$ is parallel to the axes $X_7$, $X_8$ and $X_9$ for one of its two dead centres, i.e. when the support 11 is in one of its angular positions $\alpha_1$ and $\alpha_2$. The orientation of the axis $X_5$ parallel to the axes $X_7$, $X_8$ and $X_9$ is thus carried out with the maximum precision. The second mechanical movement transmission assembly 20 is configured such as to be able to adopt two particular configurations, in each of which the connecting arms 23 and 24 generate a dead centre for the support 21. In this case, a dead centre is generated for the support 21 when the axis $X_8$ of the pivot connection between these connecting rods coincides with the plane which passes via the axes $X_7$ and $X_9$ of the pivot connections between the connecting rod 23 and the connection arm 22, and between the connecting rod 24 and the frame 2, respectively. In the embodiment in FIGS. 1 and 2, a first dead centre is generated when the axis $X_8$ is situated between the axes $X_7$ and $X_9$, as represented in these figures, and a second dead centre is generated when the axis $X_9$ is situated between the axes $X_7$ and $X_8$. For other configurations of the second mechanical assembly 20, a dead centre could be generated when the axis $X_7$ is situated between the axes $X_8$ and $X_9$. During the passage via a dead centre, the direction of rotation of the support 21 is inverted for the same direction of rotation of the actuating device 25. This inversion of the direction of rotation is carried out for two angular positions $\beta_1$ and $\beta_2$ of the support 21 around the axis $X_5$. Thus, continuous rotation of the connecting rod 24 around the axis $X_9$ gives rise to a balance movement of the support 21 between the angular positions $\beta_1$ and $\beta_2$. These positions are stable positions, since the transmission ratio between the angular displacement of the connecting rod 24 and that of the support 21 is cancelled out locally. Preferably, the second mechanical assembly 20 is configured such that the axis $X_6$ is combined with the axis $X_1$ for one of its two dead centres, i.e. when the support 21 is in one of its angular positions $\beta_1$ and $\beta_2$. The alignment of the axis $X_6$ with the axis $X_1$ is thus carried out with the maximum precision.

The angular positioning device according to the invention is particularly well suited for carrying out the calibration of an optical instrument. An element of the optical instrument, for example a mirror, can be secured on the second support. The first mechanical movement transmission assembly makes it possible to orient the element precisely for two angular positions around a first axis, and the second mechanical movement transmission assembly makes it possible to orient it precisely for two angular positions around a second axis, which is not parallel to the first. One of the angular positions of interest around the first axis corresponds to one of the angular positions of interest around the second axis, such that the element of the optical instrument is positioned precisely around the first and the second axis for three distinct dimensions.

The invention claimed is:

1. An angular positioning device comprising a frame, a first mechanical movement transmission assembly, and a second mechanical movement transmission assembly, the first mechanical assembly comprising:
    a first support in pivot connection with the frame, according to a first axis;
    a first connecting rod in pivot connection with the first support, according to a second axis, which is parallel with the first axis;
    a second connecting rod in pivot connection with the first connecting rod, according to a third axis, and in pivot connection with the frame according to a fourth axis, the third and fourth axes being parallel with the first and second axes; and
    a first actuating device configured to rotate the second connecting rod according to the fourth axis,
the first mechanical movement transmission assembly being configured such that the first support is configured to adopt two distinct angular positions around the first axis, for each of which the first and second connecting rods generate a dead centre for the first support;
the second mechanical movement transmission assembly comprising:
    a second support in pivot connection with the first support according to a fifth axis, which is not parallel with the first axis;
    a third connecting rod in pivot connection with the second support according to a sixth axis, and in pivot connection with the second support according to a seventh axis, which is parallel with the fifth axis;
    a fourth connecting rod in pivot connection with the third connecting rod according to an eighth axis, and in pivot connection with the frame according to a ninth axis, the eighth and ninth axes being parallel with the fifth and seventh axes; and
    a second actuating device configured to rotate the fourth connecting rod according to the ninth axis,
the second mechanical movement transmission assembly being configured such that the second support is configured to adopt two distinct angular positions around the fifth axis, for each of which the third and fourth connecting rods generate a dead centre for the second support,
the angular positioning device being configured such that the fifth axis is parallel with the seventh axis in one of the angular positions of the first support around the first axis, and in that the sixth axis is combined with the first axis, in one of the angular positions of the second support around the fifth axis.

2. The device according to claim 1, wherein the seventh, eighth and ninth axes are at right angles to the first, second, third and fourth axes.

3. The device according to claim 1, wherein the first actuating device comprises a rotary motor comprising a stator which is integral with the frame of the angular positioning device, and a rotor which is integral with the second connecting rod.

4. The device according to claim 1, wherein the second actuating device comprises a rotary motor comprising a stator which is integral with the frame of the angular positioning device, and a rotor which is integral with the fourth connecting rod.

5. The device according to claim 1, wherein the first support comprises a drive arm, the pivot connection of the first support with the frame being provided at a first end of the drive arm, and the pivot connection of the first support with the first connecting rod being provided at a second end of the drive arm.

6. The device according to claim 1, wherein the first support comprises a framework inside which the second support is arranged.

7. The device according to claim 1, wherein the first and second connecting rods generate a dead centre for the first support when the third axis coincides with the plane which contains the second axis and the fourth axis.

8. The device according to claim 1, wherein the third and fourth connecting rods generate a dead centre for the second support when the eighth axis coincides with the plane containing the seventh axis and the ninth axis.

9. The device according to claim 1, wherein the pivot connections between the third connecting rod and the second support comprise a first pivot connection between the third connecting rod and a connection arm according to the seventh axis, and a second pivot connection between the connection arm and the second support according to the sixth axis.

10. A system for calibration of an optical instrument, comprising an angular positioning device according to one of the preceding claims, an element of the optical instrument being able to be secured on the second support.

* * * * *